United States Patent [19]

Siegel et al.

[11] 4,383,445
[45] May 17, 1983

[54] CAPACITANCE CIRCUIT FOR LEVEL MEASUREMENT

[75] Inventors: Leon S. Siegel, Sand Springs; Charles O. Holman, Tulsa, both of Okla.

[73] Assignee: Combustion Engineering, Inc., Windsor, Conn.

[21] Appl. No.: 229,436

[22] Filed: Jan. 29, 1981

[51] Int. Cl.³ .............................................. G01F 23/26
[52] U.S. Cl. ................................... 73/304 C; 361/284
[58] Field of Search ....................... 73/304 C; 361/284

[56] References Cited

U.S. PATENT DOCUMENTS

| | | | |
|---|---|---|---|
| 2,942,467 | 6/1960 | Campani | 73/304 C |
| 2,974,526 | 3/1961 | Lerner et al. | 73/304 C |
| 3,781,672 | 12/1973 | Maltby et al. | 73/304 C |
| 3,879,644 | 4/1975 | Maltby | 73/304 C |
| 4,069,710 | 1/1978 | Treier | 73/304 C |
| 4,169,543 | 10/1979 | Hall | 73/304 C |
| 4,178,623 | 12/1979 | Emmerich et al. | 73/304 C |

FOREIGN PATENT DOCUMENTS 1648163  4/1970  Fed. Rep. of Germany .... 73/304 C

*Primary Examiner*—Howard A. Birmiel
*Attorney, Agent, or Firm*—Arthur L. Wade

[57] ABSTRACT

The circuit of a primary element capacitor is energized and arranged to produce a proximity signal not substantially affected by the conductivity of fluid-like material accumulated on the capacitor structure. The energization, circuit components, and capacitor insulation minimize the electrical characteristics of the material accumulation on the capacitor.

4 Claims, 4 Drawing Figures

CAPACITANCE CIRCUIT FOR LEVEL MEASUREMENT

TECHNICAL FIELD

The present invention relates to the circuit of a capacitor element which is responsive to the proximity of the level of fluid-like material which will compensate for physical accumulations of the material on the capacitor. More particularly, the invention relates to increasing the frequency energization of a capacitance circuit and the inclusion of fixed capacitor elements which will minimize the effect of the conductivity of material accumulation on the primary element of the circuit and the selective insulation of the element to minimize the capacitive effect of the accumulation.

BACKGROUND ART

The primary element in the form of a capacitor, and the circuit in which it is included, is well-developed in the prior art. The entire structure of the capacitor element, including both plates, may be referred to as a "probe". On the other hand, it is common practice to form one of the plates of the capacitor in the form of a rod extending from the wall of a container which electrically functions as the second plate of the capacitor. Therefore, the rod may be referred to as the "probe" with the understanding in the art that the rod and conductive wall of the container, together, electrically function as the capacitor.

Fluid-like material may be flowed into the container and form an increasing level. The increasing level of fluid-like material, having a finite dielectric constant, displaces the atmosphere, usually air, in the space separating the rod and container side. Regardless of the fact that the capacitor has one plate in the form of a rod and the other plate in the form of the container side, the fluid-like material displaces the atmosphere in the space separating the "plates" as the level of fluid-like material rises within the container.

An oscillator, generating a periodically varying voltage, can be connected to ground through a resistance in series with the rod-container capacitor and variations of the voltage in this circuit can be detected at the connection between the resistance and capacitor. A voltage detector is commonly connected between the resistance and the capacitor probe to manifest the variations in voltage at this point in the circuit as reflective of the level of fluid-like material coming into proximity to the capacitor plates.

There has been a basic problem in the probe circuit when material, whose dielectric constant influences the probe, physically accumulates on the probe structure. The conductivity of accumulations of material sensed by the probe maintains a low resistance, or leakage, to ground which lowers the voltage at the junction between the resistance and the probe. This causes the detector to remain "locked up", i.e. tripped at the lowered voltage level.

What this circuit requires is: a structure and an arrangement which will nullify the lowered voltage due to the low resistance path of the material accumulated on the probe. The circuit must respond only to the proximity of the level of the body of fluid-like material to the probe. Although the structure and arrangement is required to nullify the effect of the resistance lowering of the voltage, it must not affect the response of this primary element to the proximity of the level of material. Further, the accumulation of the material on the probe must be nullified in its capacitive effect on the proximity signal of the probe.

DISCLOSURE OF THE INVENTION

The present invention contemplates establishing a frequency value for the periodically varying form of voltage applied to the circuit of a capacitor employed as a primary element responsive to the proximity of the level of fluid-like material. Further, the invention contemplates the selection of a fixed capacitance value parallel the primary element capacitor which will, in combination with the energization with increased frequency, minimize the effect of the resistance of accumulations of the sensed material on the primary element. Further, the invention contemplates an increase in the insulation between the probe plates in the region of their closest approach to each other to minimize the capacitive effect of material accumulations on the probe.

Other objects, advantages and features of this invention will become apparent to one skilled in the art upon consideration of the written specification, appended claims, and attached drawings.

BRIEF DESIGNATION OF THE DRAWINGS

BEST MODE FOR CARRYING OUT THE INVENTION

Lexicon Benchmarks

The value of capacitance of a parallel-plate capacitor is directly proportional to the product of the dielectric constant of material between the plates and the area of the plates and is inversely proportional to the distance between the plates: $C = \epsilon \times A/D$. Again, in the present disclosure, the plates of the capacitor are given the specific form of a rod mounted on, but insulated from, the conductive wall of a container which is the second plate. Therefore, the mathematical relationship accommodates the effective areas of these specific forms given the capacitor plates. In the present disclosure, the capacitor plates are, of course, not parallel nor of equal area, hence A would represent the effective area of the plates, and D would represent the effective distance between the plates. The effective areas of the capacitance-probe would remain constant as would the distance between the plates. The only parameter that changes is the dielectric of the material as it approaches the space between the plates. As the level of the fluid-like material rises, the dielectric medium between the probe-capacitor plates changes from that of the surrounding atmosphere, generally air, to a combination of air and fluid-like material being level sensed and approaches the dielectric constant of the fluid-like material being level sensed. The capacitance value of the probe varies directly as the dielectric of the medium between the capacitor plates varies. The capacitive reactance of the probe varies inversely with the capacitance of the probe. A variation in the capacitive reactance causes the voltage at the connection between the resistance and probe to vary. Thus, it can be seen that the fluid-like material forming a level rising in the space between the capacitor plates of the probe varies the capacitance of the probe which, in turn, causes a change in the capacitive reactance which ultimately causes a change in the voltage at the connection between the resistance and probe.

Figure 1:
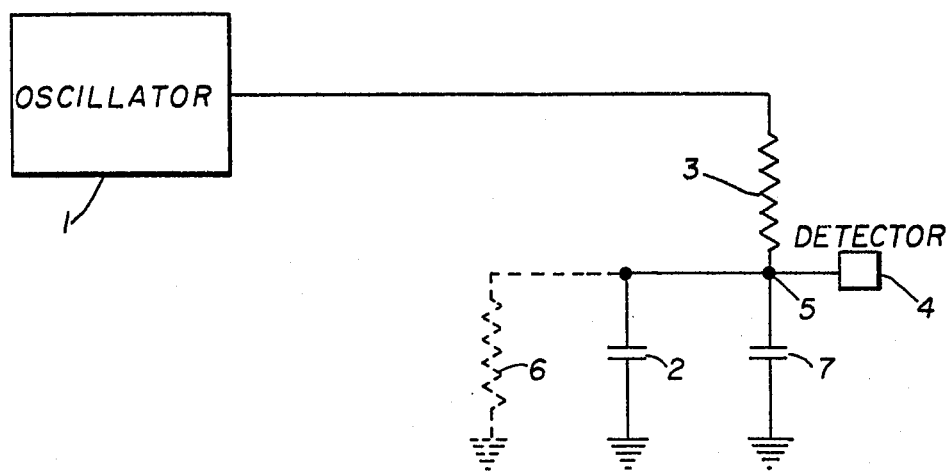
FIG. 1 is a schematic of the capacitance circuit in which the present invention is embodied.

FIG. 1—Resistance Compensation

FIG. 1 can be described as a probe circuit wherein an oscillator 1, generating a sine wave voltage as a periodically varying voltage, is connected to ground through series-connected probe 2 and resistance 3. Fluid-like material forming a level rising in the space separate the capacitor elements of probe 2 then changes the voltage in the connection between resistance 3 and probe 2. A detector 4 responds to the magnitude of the voltage at connection 5. This arrangement then produces voltage variations at connection 5 which bear a relation to the dielectric constant of the level of material whose proximity is sensed by probe 2. These voltage variations at connection 5 are then manifested by detector 4. This is, admittedly, a rather broad, simplistic disclosure of the specific form given a probe circuit in FIG. 1. However, this form of disclosure will, hopefully, make the invention clear.

The first problem with which the present circuit interfaces is a physical phenomena. One plate of the probe capacitor 2, in the form of a rod, is projected horizontally into the path of a body of material. The fluid-like material accumulation displaces the atmosphere in the space separating the capacitor plates and its dielectric varies the voltage level at connections 5. When the dielectric constant of the material effectively changes the value of the probe capacitance by its proximity to the capacitor plates, the voltage value at connection 5 changes and is detected by 4. The physical problem descends when the material accumulates on the horizontal probe structure. Electrically, the accumulated material affects the probe circuit as both a capacitance and as a resistance value. The problem will first be considered in its effect on the circuit as a resistance.

In FIG. 1, the resistance value of the accumulation between capacitor plates is represented at 6. The physical accumulation of the sensed material is not represented, only its resistance 6 is disclosed in its relationship to the circuit. As a resistance, the material accumulated will have a spurious effect on the voltage signal sensed at 5. The present invention reduces this effect to insignificance.

The present invention first introduces a fixed value of capacitance 7 connected in parallel with probe 2. The value of 7 is made large enough to significantly reduce the value of the combined capacitive reactance of both 2 and 7. Second, the frequency of the voltage output of oscillator 1 is increased to further reduce the value of the capacitive reactance. With the capacitive reactance of the probe circuit reduced by the increased frequency and the size of capacitor 7, the mathematical relationships demonstrate that the anticipated values of resistance 6 will have an insignificant effect on the voltage signal detected at 5.

The name of the game is to control the impedance of the probe circuit at connection 5. This impedance must not be significantly changed by the introduction of the resistance of the physical accumulation on probe 2.

Mathematically, a pair of formulas will readily demonstrate impedance control by the invention. First, capacitive reactance ($X_c$) of the probe circuit is expressed by the formula $$X_c = \frac{1}{2\pi f C}$$

By the above formula, it is obvious that $X_c$ is reduced in value as the frequency (f) of oscillator 1 is increased, and as the value of capacitor 7 (C) is increased.

The all-important value of impedance (Z) is controlled by the formula $$\frac{R \times X_c}{(R^2 + X_c^2)^{\frac{1}{2}}}$$

where R is the value of resistance 6.

In reducing the invention to practice, success was obtained in reducing the influence of the values of R by increasing the values of f and C until $X_c$ is at least 10 times less than the value of R.

In a specific example: $X_c = \dfrac{1}{2\pi \times 5 \text{ MHZ} \times 300 \times 10^{-12} \text{ farads}}$ $$X_c = 106.1 \text{ Ohms.}$$

Assuming 1500 Ohms as the reasonable anticipated value of R, $$\text{impedance } (Z) = \frac{1500 \text{ Ohms} \times 106.1 \text{ Ohms}}{(1500^2 \text{ Ohms} + 106.1^2 \text{ Ohms})^{\frac{1}{2}}} = 105.8 \text{ Ohms.}$$

Obviously, the introduction of the 1500 Ohms resistance altered the impedance from the capacitive reactance value only 0.2%; therefore, it is an insignificant variation in the value of impedance of the circuit and, therefore, an insignificant variation of the value of the voltage signal at 5.

Figure 2:
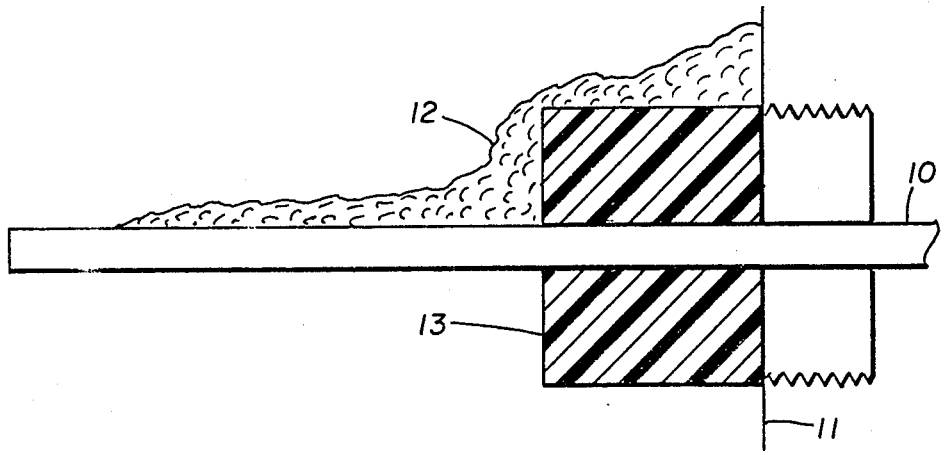
FIG. 2 is an elevation of the probe with proximity-sensed material accumulated thereon.

FIG. 2—Capacitance Compensation

By the use of the invention to reduce the effect of the resistance of the build-up on impedance of the probe circuit, a large build-up of material can be tolerated without effect on the detection of capacitance at probe 2. The other problem of build-up is the capacitance value added by the material build-up. The present invention meets this problem by arranging insulating material at the area where the electrodes of the probe have the shortest distance between them, which is the area where the material build-up will cause the greatest capacitive change. Referring to the foregoing equation for capacitance, $C = \epsilon \times A/D$, the effective areas of the probe plates are fixed. The dielectric of the capacitance is that of the insulating material. By supplying an insulation that is thick, as opposed to thin, the capacitance can be minimized because the denominator, D, will be large relative to the numerator. Thick, here, is meant to be the height of the cross-sectional area of the insulator shown in FIG. 2.

FIG. 2 discloses the generalized physical arrangement of the probe and build-up thereon bridging the plates. Electrode 10 is extended horizontally from its mounting on wall 11. It is the capacitance value between electrode 10 and wall 11 which is to be changed by the proximity of the level of rising material within the container of wall 11. Keep in mind that the probe formed by electrode 10 and wall 11 is represented in FIG. 1 by capacitor 2.

The physical adherence of material on electrode 10 is represented at 12. This material 12 is shown in accumulation on the upper side of electrode 10 and the upper side of a large insulator 13 which is arranged about the electrode 10 and near wall 11.

What this accomplishes is to put the dielectric of the teflon insulator 13 in series with the dielectric of the material being measured by the probe. If the material build-up has a high dielectric, then the capacitance is reduced to the capacitance of the teflon section, or less. If the dielectric of the material build-up is low, then this capacitance is even further reduced. This is because we have two capacitances in series and their total capacitance is less than the smaller one.

FIG. 3

Figure 3:
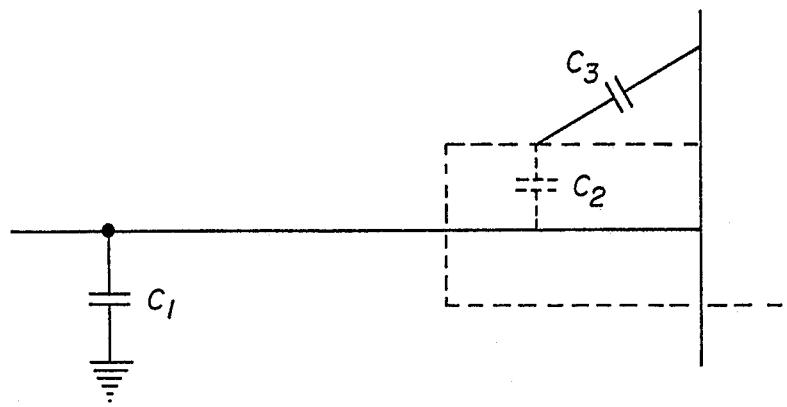
FIG. 3 is a schematic of the electrical equivalent of FIG. 2.

FIG. 3 is presented to make clear the electrical relationship between the insulator body 13, electrode 10, electrode 11 and material accumulation 12. $C_2$ is shown as symbolizing the capacitance of the insulating body 13 and is connected in series with $C_3$ which symbolizes the capacitive effect of the accumulation 12.

Capacitors $C_2$ and $C_3$, being in series, will be smaller or equal to the capacitance of the smaller value. The equivalent capacitance of $C_2$ and $C_3$, $$C_{eq} = \frac{C_2 \times C_3}{C_2 + C_3}.$$

This relationship establishes that the equivalent capacitance of two capacitors in series will be smaller than the capacitance of the smaller capacitor.

This leaves the electrode 10 sensing the proximity of the level of the material in the vessel without being affected by the material build-up on the probe.

FIG. 4

Figure 4:
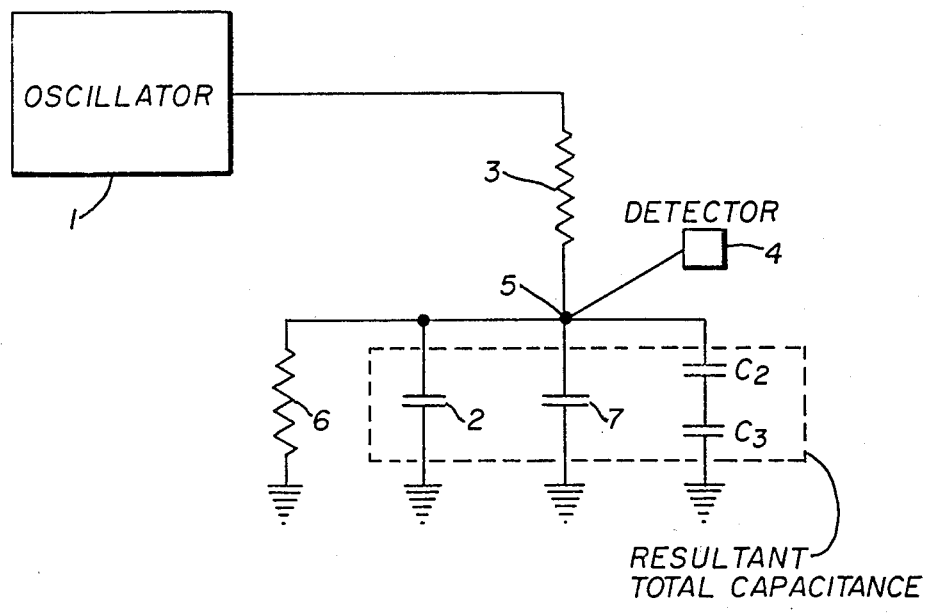
FIG. 4 is a circuit schematic representing the combination of FIGS. 1 and 3.

FIG. 4 is a schematic representation of the combination of FIGS. 1 and 3. FIG. 4 represents the complete circuit in which compensation is made for both the resistive and capacitive characteristics of the material accumulation on the probe.

The capacitance $C_2$ symbolizes the capacitance of the insulating body 13, the value of which capacitance is small, and the equivalent capacitance of capacitors $C_2$ and $C_3$ in series is smaller than or equal to the smaller of the two capacitance values $C_2$ and $C_3$. With that equivalent capacitance in parallel with the parallel capacitance 7, the resultant total capacitance in the circuit will be slightly greater than the parallel capacitance 7. The resultant total capacitance in the circuit being larger than the parallel capacitance 7 increases the ratio of material build-up resistance to total capacitive reactance on the conservative side of the greater than approximately 10 to 1 ratio as capacitive reactance is inversely proportional to capacitance. Thus, any capacitance exhibited by the probe, as well as any capacitance due to the insulator on the rod portion of the probe, as well as any capacitance due to material accumulation, further enhance this circuit design by making voltage variations detected by detector 4 even less susceptible to material accumulations.

Conclusion

The present invention was conceived to solve the problem of physical accumulation of fluid-like material on the rod extending from the wall of a container in which it is desired to sense the level of fluid-like material as the level rises within the container. The fluid-like material has both resistance and capacitance values which affect the operation of the basic circuit which has as its primary element, a rod and walls of a container as a capacitor.

To get at a definition of the invention, the basic circuit of the primary element capacitor has been defined as simply a circuit between a source of periodically varying voltage and ground, which includes the primary element capacitor. In elemental form, the circuit includes a resistance and the primary element capacitor in series with a detector connected between them to manifest variations in the voltage of the circuit. As stated before, physical accumulations of the very material whose level is measured, throws a monkey wrench into the detection of the level. Both the resistance and capacitance of the accumulations must be compensated.

For the resistance effect of the accumulations, a fixed capacitor is connected in parallel with the primary element capacitor and the frequency of the source of periodically varying voltage is set to eliminate the resistance effect of the accumulations to insignificance.

The capacitance effect of the accumulations is compensated by providing an insulator between the plates of the primary element capacitor. This insulator is mounted at that position which will reduce the capacitance effect of the accumulations to insignificance.

The structure for compensating for the electrical characteristics of the accumulations must be given values which effectively compensate. However, there should now be no doubt about the broad scope of the invention embodied in these structures.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

We claim:

1. An apparatus for detecting the level of a fluid-like material, comprising,
   a first primary element capacitor, having a first plate and a second plate, positioned to receive the rising level of fluid-like material in the space separating the first and second plates,
   a connection between the first plate of the first capacitor and ground,
   a source of periodically varying voltage,
   a fixed resistance connected between the voltage source and the second plate of the first capacitor,
   a voltage detector connected between the fixed resistance and the second plate of the first capacitor to manifest the voltage appearing at that junction, a second capacitor of substantially greater capacitance than the first capacitor connected in parallel with the first capacitor, the frequency of the voltage source and the value of the second capacitor being such as to give a capacitive reactance of the circuit of no more than one-tenth the value of resistance of the physical accumulation of the fluid-like material bridging the plates of the first capacitor.

2. The apparatus of claim 1, including, an insulator body mounted in the space separating the two plates of the first primary element capacitor in the physical position to accumulate the fluid-like material whose level is being sensed and with the capacitance value of the insulator in series with the capacitance value of the accumulation of fluid-like material bridging the plates, whereby the equivalent capacitance of the insulator and the accumulation of fluid-like material bridging the plates is equal to less than the smaller of the two capacitance values and does not substantially alter the impedance of the circuit.

3. The apparatus of claim 1, wherein, the source of periodically varying voltage generates a sinusoidal form of voltage.

4. The apparatus of claim 1, wherein, the second plate of the first primary element capacitor is in the form of a rod and is arranged to be insulated from and to protrude horizontally from the first plate of the primary element capacitor which is in the form of a vessel receiving the fluid-like material.

* * * * *